June 20, 1961   J. S. BARNETT   2,988,953
APPARATUS FOR CONTOUR PLOTTING
Filed Nov. 29, 1957   3 Sheets-Sheet 1
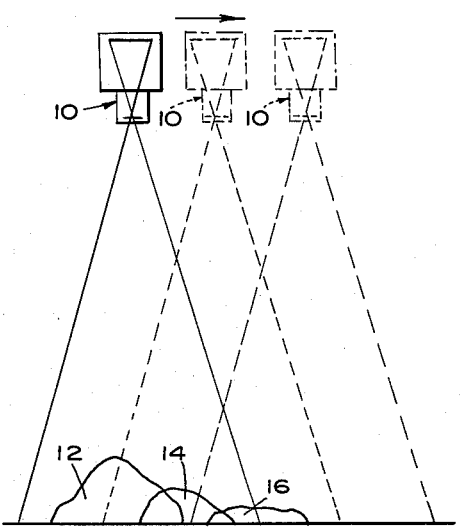
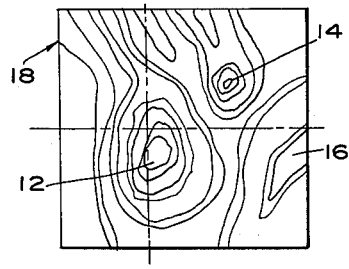
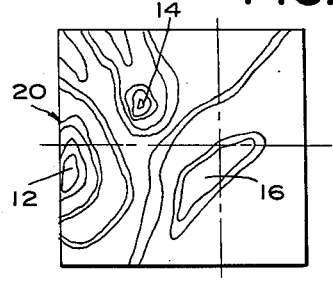
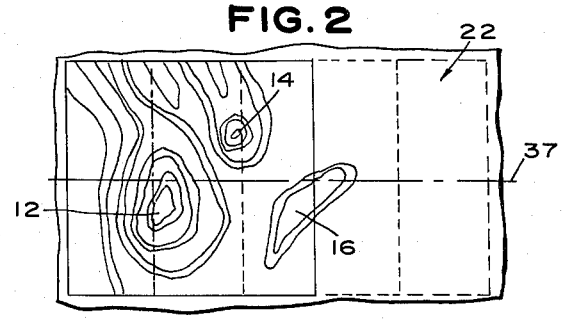
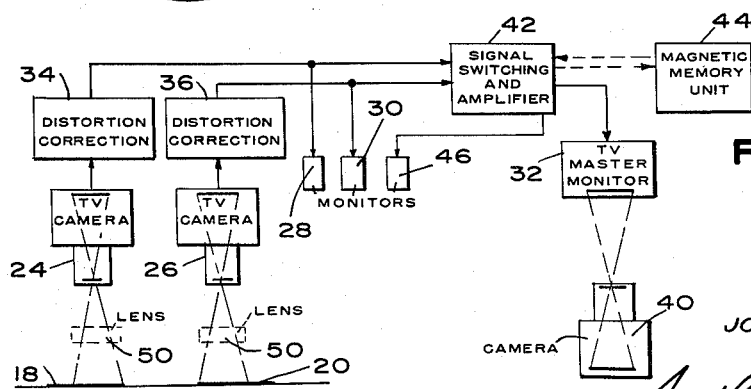
INVENTOR
JOHN S. BARNETT
BY
ATTORNEYS June 20, 1961  J. S. BARNETT  2,988,953
APPARATUS FOR CONTOUR PLOTTING
Filed Nov. 29, 1957  3 Sheets-Sheet 2

62

52

60

INVENTOR
JOHN S. BARNETT

BY
ATTORNEYS

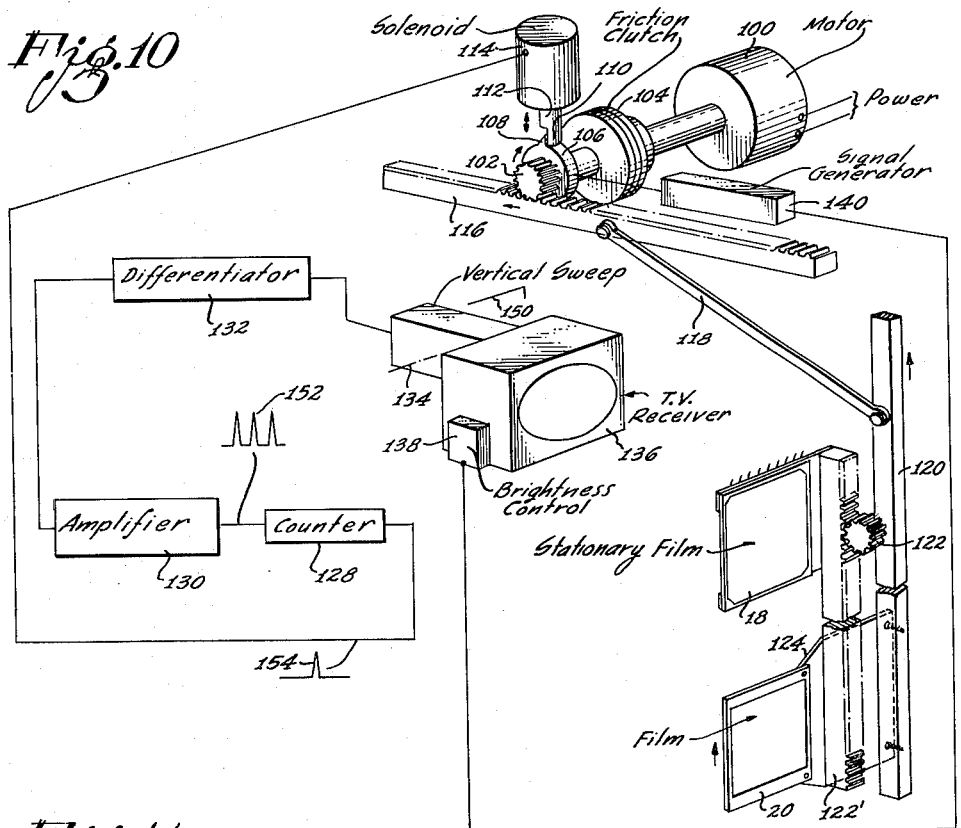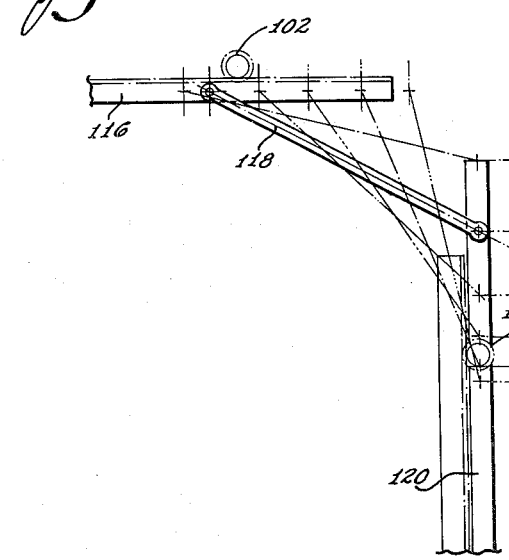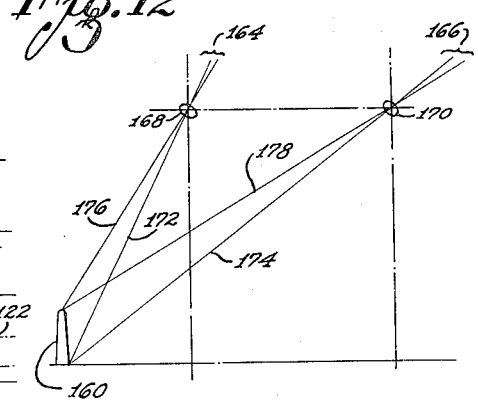

United States Patent Office 2,988,953
Patented June 20, 1961

2,988,953
APPARATUS FOR CONTOUR PLOTTING
John S. Barnett, Sepulveda, Calif., assignor to Photographic Analysis, Inc., North Hollywood, Calif., a corporation of California
Filed Nov. 29, 1957, Ser. No. 705,467
15 Claims. (Cl. 88—14)

This is a continuation in part of copending application Serial No. 483,555 filed January 24, 1955, by John S. Barnett for Topographic Maps (now Patent 2,933,008 issued April 19, 1960).

This invention relates to topographic maps and has for one of its principal objects the provision of a means for automatically producing topographic maps from aerial stereographic photographs.

One of the important objects of this invention is to provide a simple yet efficient means for producing a map of a desired territory or piece of terrain which will indicate various levels by way of density gradations whereby specific relative elevations of certain points on the map or picture can be readily determined.

A further important object of the invention is to produce a series of images of the area to be mapped and which images, when combined in accordance with the principles of this invention, will automatically indicate the elevation of a selected series of contours.

Other and further important objects of the invention will be apparent from the disclosures in the accompanying drawings and following specification.

The invention, in a preferred form, is illustrated in the drawings and hereinafter more fully described.

In the drawings:

FIGURE 1 illustrates a camera being moved along over an area to be mapped, as by an airplane or the like.

FIGURE 2 shows more or less diagrammatically three consecutive overlapping photographs taken by the camera of FIGURE 1 of the area illustrated in that figure and corresponding to the three positions of the camera shown in FIGURE 1.

FIGURE 3 illustrates a negative or photograph of a representative portion of the area to be surveyed or mapped and shows the same as taken by the camera of FIGURE 1 in its initial position.

FIGURE 4 illustrates a succeeding photograph taken by the camera when it is in its second position, as shown in FIGURE 1.

FIGURE 5 illustrates more or less diagrammatically the means for combining the photographs or negatives taken by the camera in order to produce the desired end result of this invention.

FIGURE 10 is a somewhat schematic view of apparatus for controlling the operation of the system shown in FIGURE 5 to provide contour representations of an area at different elevations and includes mechanical members on a perspective basis and electrical stages on a block diagram basis.

FIGURE 11 is an elevational view of certain members shown in FIGURE 10 and schematically illustrates the disposition of the members at successive stages of operation.

FIGURE 12 is a schematic view of an area to be mapped topographically and is included to illustrate certain principles of operation for the apparatus constituting this invention.

As shown in the drawings:

Figure 6:
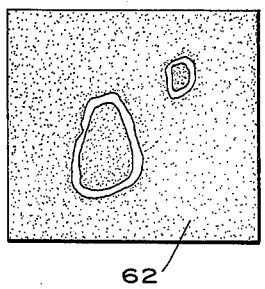
FIGURE 6 is the intermediate resultant image indicating a contour of the terrain illustrated in FIGURE 1, produced by the apparatus of FIGURE 5.

The reference numeral 10 indicates generally a camera by means of which the aerial photographs of this invention are taken. The camera is shown in three positions in FIGURE 1 and each position represents a succeeding film exposure whereby three different pictures are taken, all of which, however, are overlapping.

Also in FIGURE 1, the reference numerals 12, 14 and 16 indicate areas of different and various elevations such as hills, mountains, valleys or the like, the specific contours at different elevations of which are to be automatically determined by the process and apparatus of this invention.

The image indicated by the reference numeral 18 in FIGURE 3 represents the first picture taken by the camera 10 when it is in its initial position as shown in FIGURE 1. The image indicated by the reference numeral 20 in FIGURE 4 shows the picture taken by the camera when it is in its second position as shown in FIGURE 1 and the image indicated by the reference numeral 22 in FIGURE 2 shows a segment of film with successive pictures thereon, all of the same overlapping to some degree as indicated by the dotted and dash lines. The overlapping areas of two succeeding images constitute a stereo for the purpose of the invention. As will be seen, FIGURE 2 is a somewhat schematic view which illustrates on a composite basis how successive photographs taken from a moving airplane indicate a common portion of the terrain along at least a portion of the photographs.

The two areas of overlap in the images 18 and 20 are presented to a two camera television chain as indicated by the reference numerals 24 and 26 in FIGURE 5. The images are uniformly illuminated and provision is made for moving one of the images in two dimensions in the plane of the images and for rotating it around an axis perpendicular to this plane.

The two camera signals are controlled and viewed on their separate control monitors 28 and 30 and then mixed together in the master monitor 32, while at the same time, the two superimposed images are viewed simultaneously on the screen of the master monitor 32. Correction may be made for distortion by the electronic elements 34 and 36 respectively, and also by optical elements 50. The camera chain is fed and controlled by one synchronized generator so that all the images are locked together, and provision is made so that either camera output may have its picture polarity reversed from positive to negative. For example, the electronic elements for correcting any distortion may be constructed in a manner similar to that described on pages 241 to 244, inclusive, of "Elements of Television Systems" by George E. Anner (published by Prentiss-Hall, Inc. and first printed in 1951).

For example, if duplicate negative images were presented to the camera chain with the picture polarity positive on both cameras, a double negative image will be presented on the master monitor. Through the use of the image positioning adjustments described above, the two images may be brought into register, resulting in a single high contrast negative image on the monitor. However, if the signal from one of the cameras is reversed to negative and the signal brightness and contrast from both cameras is properly adjusted, a cancellation effect will result which will cause a uniform grey field to be presented on the master monitor 32.

In actual practice, the duplicate negatives are replaced by the two negatives of the stereographic pair 18—20 and the camera signals are adjusted to opposite polarity. The two images presented on the master monitor are then brought into approximate registration by use of the image positioning adjustments hereinabove described.

As registration is approached, areas of equal elevation (at one elevation) will register and will be presented on the master monitor as areas of uniform grey, since the two camera signals will cancel out in these areas. Areas which are at other elevations will not be in register and will be presented as out of register double image areas on the monitor 32. If the adjustable negative is moved along the line indicated by the reference numeral 37 in FIGURE 2, which is the path of the photographing airplane, by an appropriate increment, all areas at another specific elevation will cancel out in the image presented on the monitor. The movable image can be successively repositioned along the line 37, and at each position, a different cancellation pattern will be presented on the monitor, each representing all areas at a specific elevation.

These images may be photographed by additive exposure on one negative or they may be individually photographed and combined by photomechanical means. A composite contour map may be traced directly from the master monitor 32 and photographs of the images in the master monitor can be taken by a camera 40. The master monitor 32 may be any conventional type of television receiver and may especially include the cathode ray tube used in a television receiver. A conventional camera can also be used as the camera 40 under such circumstances. When a conventional camera is used as the camera 40, the pictures of the successive contours can be taken individually and manually without departing from the spirit and scope of the invention. It is also possible to use a motion picture camera as the camera 40 so that pictures are automatically taken of the different contour lines.

In FIGURE 5, the signal switching and amplifying unit is indicated by the reference numeral 42, a magnetic memory unit by the reference numeral 44 and an additional monitoring device by the reference numeral 46. The magnetic memory unit 44 may constitute a conventional rotary drum in which signals are recorded at successive positions on tracks on the drum in accordance with the amplitude of the signals passing through the amplifier 42 at successive instants of time. As will be appreciated, the amplifier 42 may be constructed in a conventional manner to mix the signals from the cameras 24 and 26 and to amplify the mixed signals. The presentation of successive positions on the memory unit 44 corresponds to the horizontal travel of the flying spots from the cameras 24 and 26 respectively across the pictures 18 and 20. The flying spots travel horizontally across the pictures 18 and 20 and shift downwardly after each scan to initiate a new horizontal scan.

It should be appreciated that the memory unit 44 is included only as an additional stage and does not constitute an essential part of the system. The reason is that the signals from the amplifier 42 may be introduced directly to the monitor 32, as may be seen from the full line extending from the amplifier 42 to the master monitor 32. This full line is in contrast to the broken lines extending between the amplifier 42 and the memory unit 44. The broken lines extending between the amplifier 42 and the memory unit 44 indicate that the signals from the amplifier 42 do not necessarily have to be introduced to the memory unit 44.

The transfer of signals from the amplifier 42 directly to the master monitor 32 or to the memory unit 44 is controlled by the signal switching portion of the amplifier 42. When the information is transferred to the memory unit 44, it is stored for subsequent use. This stored information may be subsequently transferred to the monitor 32 by a proper operation of the signal switching portion of the amplifier 42. The master monitor 32 then operates upon the signals passed by the unit 42 to indicate the contour lines in a visual form.

If the memory unit 44 is not included in the system, the switching portion of the amplifier 42 would also not have to be included. In this way, the signals from the cameras 24 and 26 would be introduced directly to the amplifier portion of the unit 42. The amplifier portion of the unit 42 would then operate on the signals from the cameras 24 and 26 to mix these signals, amplify the mixed signals and then introduce the amplified signals to the master monitor 32. The amplifier portion of the unit 42 may be constructed in a manner similar to that described on pages 347 and 348 of "Elements of Television Systems" by George E. Anner (published by Prentiss-Hall, Inc. of Englewood Cliffs, N.J. and first printed in 1951).

The monitor 46 may also be a conventional television receiver and may especially include the cathode ray tube used in the receiver. The monitor 46 operates in the same manner as the master monitor 32, the purpose of the monitor 46 being to provide a check on the operation of the master monitor 32.

Figure 7:
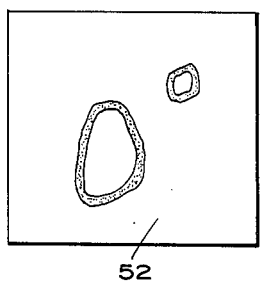
FIGURE 7 shows a negative rendition of the same image.

If the image signal polarity of the master monitor 32 is reversed and the signal contrast and brightness are properly adjusted, a condition will be reached where the contour lines appear as dark lines against the white or light mottled field, as best shown at 52 in FIGURE 7. By recording the signal of each scan, namely a series of images formed at different elevation adjustments, as outlined above, on a magnetic drum individually and successively, and then feeding them back into the master monitor, a composite image, as best shown by the reference numeral 60 in FIGURE 8, will be presented on the monitor. This composite can be photographed by the camera 40 and the result will be a contour map presenting a number of zones, all parts of each individual zone being at approximately the same elevation.

It will be evident that herein is provided a system and apparatus of plotting topographical areas which will effect an enormous saving of time, since the production of a map from each pair of images such as shown by the reference numeral 62 in FIGURE 6 would be accomplished almost instantaneously.

Figure 9:
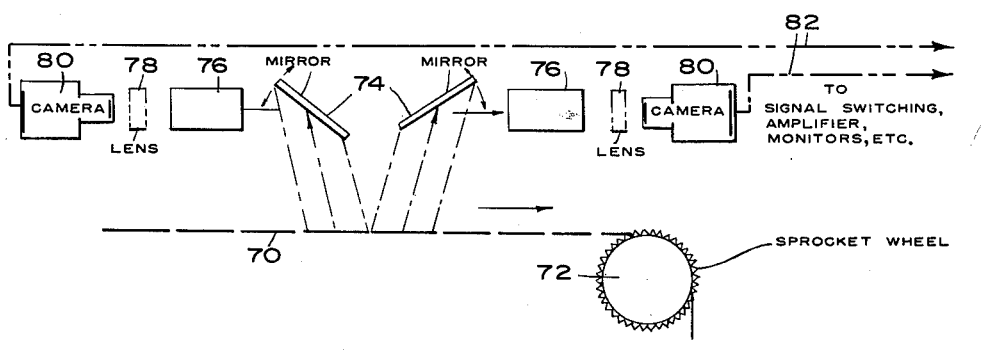
FIGURE 9 is a diagrammatic view showing a continuous system for producing topographic maps from the aerial stereographic pictures of the invention.

A semi-automatic method of presenting the negatives to the camera chain is shown in FIGURE 9, wherein the images are on a film 70 run over a sprocket 72, the images being reflected by adjustable mirrors 74 into prisms 76, thence through optical distortion correction elements 78 into cameras 80 and finally to the single switching amplifiers, master monitor and the like through lines 82. One purpose of the prisms 76 may be to deflect the image from a plane out of the plane of the paper in FIGURE 9 into a plane corresponding to the plane of the paper so that images will be directed properly toward the lenses 78. It will be appreciated that the prisms 76 may also be used for other purposes.

Apparatus is shown in FIGURE 10 for obtaining incremental shifts of one photographic representation or visual image relative to the other. The apparatus includes a motor 100 for driving a pinion 102 through a friction clutch 104. A disc 106 is mounted on the same shaft as the pinion 102 for rotation with the shaft and is provided with a lobe 108. The lobe 108 normally presses against a detent 110 at the end of an armature 112. The armature is adapted to be actuated by a solenoid 114.

The pinion 102 is in mesh with a rack gear 116 so as to drive the rack gear toward the left in FIGURE 10 as indicated by an arrow in that figure. A linkage member 118 is pivotably coupled to the rack gear 116 at one end and to an arm 120 at the opposite end. A pinion 122 is suitably attached to the arm 120 and is coupled to a stationary rack gear 122' for movement along the rack gear in accordance with the movements of the arm 120.

The film 18 is attached to the rack gear 122' for stationary disposition and the film 20 is coupled by a rod 124 to the arm 120 for movement with the arm.

The operation of the solenoid 114 is controlled by signals from a counter 128. The counter 128 is well known to the art and is adapted to provide an indication of the number of discreet pulses introduced to it. At a particular count such as a value of "3," the counter is adapted to produce an output signal and to become simultaneously triggered to initiate a new count of values between "0" and "3." The counter 128 may be constructed in a manner similar to that described on pages 198 to 203, inclusive of "Arithmetic Operations in Digital Computers" by R. K. Richards (published by D. van Nostrand Company in 1955).

The counter 128 receives signals from an amplifier 130 which operates to amplify and invert the signals produced by a differentiator 132.

The amplifier 130 may be constructed in a manner similar to that shown on pages 464 and 465 of "Principles of Television Engineering" by Donald G. Fink (published by McGraw-Hill Book Company in 1940). For example, the pulse amplifier may be constructed in a manner similar to the stage designated as the "Sync amplifier and vertical clipper" shown on page 465 of "Principles of Television Engineering." Another circuit suitable for use as the pulse amplifier is shown in page 160 of "Principles of Television Engineering." The differentiator 132 may be constructed in a manner similar to that disclosed on pages 2–27 to 2–32 of "Principles of Radar" (second edition) written by the Massachusetts Institute of Technology and published by the McGraw-Hill Book Company in 1946. The differentiator 132 receives signals from a vertical sweep circuit 134 which may be included in a television receiver 136. The receiver 136 may correspond to the televison master monitor 32 in FIGURE 5. The construction of a television receiver capable of being used as the receiver 136 is shown on pages 452 and 453 or on pages 464 and 465 of "Principles of Television Engineering" by Donald G. Fink.

The television receiver 136 also includes a grid which receives a voltage for controlling the brightness of the picture presented by the television receiver. This grid and the associated circuitry for controlling the particular voltage introduced to the grid are illustrated schematically at 138 in FIGURE 10. Circuits for controlling the brightness of the picture in a television receiver are shown on pages 453 and 465 of "Principles of Television Engineering" by Donald G. Fink. For example, the stage designated as "Brightness Control" is shown on page 453 of "Principles of Television Engineering." This stage includes an adjustable potentiometer. The effective value of this potentiometer can be changed to blank out the television picture during the time that a signal is being produced by the signal generator. The particular voltage introduced to the grid is controlled by a signal generator 140 which is adapted to produce an output signal during the time that the pinion 102 is rotating. The signal generator 120 may be constructed in a manner similar to a shunt generator or a series generator such as that described on pages 224 to 232, inclusive of "Electrical Engineering" by Clarence Christy (published by McGraw-Hill Book Company in 1938). Although the signal generator 140 is shown in FIGURE 10 as being uncoupled physically from the pinion 102, it should be appreciated that the signal generator 140 may actually be a generator driven by the same shaft as the pinion 102 so as to produce an output signal during the rotation of the pinion. The signal generator 140 may also obtain its signals from an accelerometer movable with the pinion 102 so as to produce a signal upon an acceleration or deacceleration in the movements of the pinion.

The motor 100 is constantly in operation but is unable to drive the pinion 102 during the time that the lobe 108 on the cam 106 is engaged by the detent 110 at the end of the armature 112. The pinion 102 is able to remain stationary while the motor 100 is turning because of the operation of the friction clutch 104.

Figure 8:
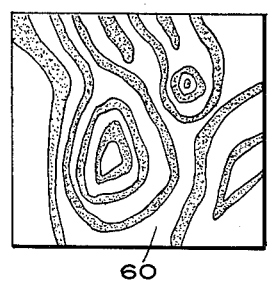
FIGURE 8 illustrates a composite of several contours such as that shown in FIGURES 6 and 7 and pictures the end result whereby different elevations are immediately discernible.

As previously described, the television receiver 136 is scanning the signals passing through the gating amplifier 42 from the television cameras 24 and 26. The gating amplifier 42 is biased to pass signals only at the positions of coincidence on the visual images represented by the films 18 and 20 as these visual images are scanned by the television cameras 24 and 26. When a signal representing a position of coincidence passes through the amplifier 42, it is introduced to the stages controlling the brightness of the image in the television receiver 136 such that the receiver provides a distinctive indication. This distinctive indication appears at a particular position on the screen dependent upon the time that the signal passes through the gating amplifier 42. The position of the distinctive indication in the television receiver 136 represents the position of coincidence in the images scanned by television cameras 24 and 26. These positions of coincidence are shown in FIGURES 6, 7 and 8.

As is well known, the vertical scan of a television receiver is controlled by a sawtooth wave form introduced to the vertical sweep of the television receiver. This sawtooth wave form is illustrated at 150 in FIGURE 10. As the voltage increases linearly in the operative portion of the sawtooth wave, the television receiver scans horizontally across the television screen at correspondingly lower positions in the picture. The sawtooth voltage then returns sharply from a maximum position to a zero position. This causes the light beam in the television receiver to return from the bottom to the top of the television tube such that a new vertical sweep is initiated in the television receiver.

The steep portion of the sawtooth voltage at the end of each vertical sweep is differentiated by the stage 132 to produce a sharp triggering pulse of negative polarity. This pulse is amplified and inverted by the stage 130 to obtain a positive pulse for introduction to the counter 128 at the end of each vertical scan in the television receiver. The positive pulses introduced to the counter 128 are illustrated at 152 in FIGURE 10. The counter 128 counts a particular number of such pulses and then produces an output pulse indicated at 154 in FIGURE 10. This output pulse is introduced to the solenoid 114 to energize the solenoid.

When the solenoid 114 becomes energized, it activates the armature 112 to move the detent 110 out of coupled relationship with the cam 106. This frees the cam 106 and pinion 102 for rotation with the motor 100. The cam 106 and the pinion 102 are able to rotate through only one revolution since the solenoid 114 is energized only for an instant. This causes the detent 110 to engage the lobe 108 after a single revolution of the pinion 102 and until the solenoid 114 again becomes energized.

The rack 116 is driven toward the left in FIGURE 10 through an equal increment of distance every time that the pinion 102 rotates through a single revolution. However, equal increments of movement by the rack gear 16 do not impart equal increments of movement to the arm 120 because of the transverse relationship between the rack gear and the arm and because of the coupling of these members through the linkage 118. As will be seen in FIGURE 11, equal increments of movement by the rack gear 116 toward the left in FIGURES 10 and 11 produce progressively increased increments of movement upwardly by the arm 120. Thus, the first increment of movement by the arm 120 is relatively small and successive increments of movement have progressively increasing amplitudes. The film 20 follows the movements of the arm 120 because of its coupling to the arm through the rod 124.

Each shifting of the visual image represented by the film 20 relative to the visual image represented by the film 18 causes the position of coincidence seen by the cameras 24 and 26 to represent a different elevation. In the embodiment shown in FIGURE 10, each increment of movement of the film 20 relative to the film 18 causes an increased elevation to be tested for positions of coincidence to develop a contour representation.

Although the film 20 moves with the arm 120 in increments of progressively increasing amplitude, the increments in elevation are of substantially equal magnitude. This may be seen from FIGURE 12. As will be seen, an increment in elevation at ground level represents only a relatively small change in the viewing angle because of the great distance between the ground and the height at which the pictures 18 and 20 were taken. However, near the top of a high mountain 160 a corresponding increase in elevation causes a considerable change in the viewing angle to occur in comparison to the change in the viewing angle at ground level. Because of this considerable change in the viewing angle at high elevations, an increased increment of movement has to be obtained to provide compensations so that the increments in elevation will remain constant.

The progressive increments in the movement of the film may be seen from another illustration. By progressively moving the film 20, the film may be considered as being moved toward the right in FIGURE 12 with respect to a mountain being plotted topographically. At a position almost directly above the mountain, the angle subtended by the bottom and top of the mountain is relatively small. However, at a position toward the right in FIGURE 12, the angle subtended is considerably increased. This indicates that the increments in displacement of the film 20 would have to be increased as the film is moved toward the right.

FIGURE 12 also illustrates how the contours of different elevations are obtained as one visual image is shifted relative to the other. As will be seen, one visual image of the mountain 160 may be considered to have been taken from a position 164 and the other visual image may be considered to have been taken from a position 166. As will be seen, the topographic representation of the ground plane occurs when the images are relatively positioned so that beams of light pass through lenses 168 and 170 from the ground plane. This may be illustrated by light rays 172 and 174 in FIGURE 12. Similarly, the topographic representation of the top of the mountain occurs when the images are relatively positioned so that beams of light pass through the lenses 168 and 170 from the top of the mountain. These beams of light may be illustrated by light rays 176 and 178 in FIGURE 12.

During the time that the visual image represented by the film 20 is being shifted relative to the visual image represented by the film 18, a signal is produced by the generator 140. This signal is produced because the generator is responsive to the movements of the pinion 102 and the cam 106. The signal produced by the generator 140 is introduced to the stages 138 controlling the brightness of the picture presented by the television receiver 136. This signal inhibits the presentation of a picture by the television receiver during the time that the visual images are being shifted through an increment to test for a different elevation. In this way, no blurring of images can be produced in the television receiver during the time that one of the images is being shifted relative to the other. It should be appreciated that this relative shift in the visual images does not necessarily have to be performed by a physical movement of one image relative to the other. For example, the relative shift may be performed by electronic means such as by delaying the presentation of an image from the camera 26 to the gating means 42 relative to the presentation of the other image from the camera 24 to the gating means. This delay can be provided by circuits such as the sweep circuits within the camera 26. Suitable circuits for delaying the horizontal sweep are disclosed on pages 408, 409 and 410 of "Principles of Television Engineering" by Fink.

The vertical sweep continues during the time that the images are being shifted even though no image is produced by the receiver because of the introduction of an inhibiting signal to the stages 138. It may happen that the introduction of the inhibiting signal to the stages 138 causes the visual presentation on the screen of the receiver 136 to become discontinued in the middle of a vertical sweep. This should present no problems since a plurality of vertical sweeps are obtained at each relative position of the films 18 and 20 before another incremental shift in the relative positions is initiated. In this way, at least one full sweep is obtained in each relative position of the films 18 and 20 regardless of the time in a sweep when the inhibiting signal introduced to the stages 138 is discontinued.

Certain terms such as "visual images," "pictorial representations," and "photographic representations" are used in the claims. It should be appreciated that these terms are intended to cover situations where visual represensations may have originally been provided but where these representations may have been converted into some coded form. For example, the visual representation could have been converted into a magnetic form for storage on a magnetic drum. This would still be considered as coming within such terms as "visual images," "pictorial representations" and "photographic representations" within the range of equivalents set forth in the specification and within the scope of the claims.

It should also be appreciated that the term "particular area" is intended to cover more than geographic terrain. Actually, it would be considered as covering any surface such as a workpiece manufactured by machine tools or a model. It is believed that a person skilled in the art would consider this as equivalent to geographic terrain from the standpoint of the claims.

It will be seen from the above discussion that the pictorial representations such as the photographs 18 and 20 are stationary during the production of each contour representation. First electrical means including the camera 24 are operative upon the first pictorial representation such as the photograph 18 for sequentially scanning the first pictorial representation at all of the different positions in the first pictorial representation to produce signals in accordance with the light characteristics of the position on the first pictorial representation being scanned at each instant. Second electrical means including the camera 26 are operative upon the second pictorial representation such as the photograph 20 for sequentially scanning the second pictorial representation at all of the different positions in the second pictorial representation to produce signals in accordance with the light characteristics of the position on the second pictorial representation being scanned at each instant.

Means including the amplifier 42 are responsive to the signals from the first and second scanning means for mixing such signals to produce resultant signals having at each instant characteristics dependent upon the characteristics of the signals from the first and second scanning means. Third electrical means including the master monitor 32 are provided for sweeping all of the different positions in a particular area and are responsive to the signals from the mixing means for producing a visual contour in the particular area in accordance with the characteristics of the signals from the mixing means.

When visual indications are to be provided of different contours, means are included for producing adjustments in the sequential scanning of the first pictorial representation by the first scanning means relative to the sequential scanning of the second pictorial representation by the second scanning means. By way of illustration, such adjustments may be obtained by displacing the photograph 18 relative to the photograph 20, such as shown in FIGURE 2.

I am aware that many changes may be made and numerous details of construction varied throughout a wide range without departing from the principles of this invention, and I therefore do not propose limiting the patent granted hereon otherwise than as recited in the appended claims.

I claim:

1. In combination for comparing a pair of pictorial representations taken of a particular area from a pair of spaced positions to obtain contour indications of the particular area, means operative upon the pictorial representations for scanning the pictorial representations to search for positions of coincidence between the pictorial representations, means coupled to the scanning means for presenting for view the positions of coincidence between the pictorial representations upon the occurrence of each scan to produce contour indications, means responsive to the signals from the scanning means for shifting at least one of the pictorial representations relative to the scanning means upon the completion of each scan, and means responsive to the shifting means and coupled to the scanning means for initiating a new scan after each shifting operation.

2. In combination for comparing a pair of pictorial representations taken of a particular area from a pair of spaced positions to obtain contour indications of the particular area, means operative upon the pair of pictorial representations for shifting the presentation of one of the pictorial representations relative to the presentation of the other pictorial representation and for providing such shifts on an incremental basis, means including electrical circuitry responsive to the shifting means for scannnig different positions in the pictorial representations upon the completion of each incremental shift in the pictorial representations to search for positions of coincidence between the pictorial representations in each scan, and means responsive to the scanning means and operative after each incremental shift for presenting for view the positions of coincidence between the pictorial images in each search for the production of contour indications of the particular area.

3. In combination for comparing a pair of pictorial representations taken of a particular area from a pair of spaced positions to obtain contour indications of the particular area, means operative upon the pictorial representations for providing incremental displacements of one pictorial representation relative to the other in a particular direction, means coupled to the displacement means and operative upon the occurrence of the incremental displacements between the pictorial representations to scan the pictorial representations in different positions of the representations, amplifiers means coupled to the scanning means for producing a signal having particular characteristics upon the occurrence of positions of coincidence in the scanned pictorial representations during the scanning of the pictorial representations in different positions of the representations, means responsive to the signals of particular characteristics from the amplifier means for presenting indications for view at positions corresponding to the positions of coincidence in each scan, and means responsive to the operation of the last mentioned scanning means for instituting an operation of the displacement means upon the completion of each scanning operation.

4. In combination for comparing first and second pictorial representations taken of a particular area from a pair of spaced positions to obtain contour indications of the particular area, means operative upon the first pictorial representation for producing first signals having characteristics corresponding to the characteristics of the first pictorial representation at successive positions on the first pictorial representation, means operative upon the second pictorial representation for producing second signals having characteristics corresponding to the characteristics of the second pictorial representation at successive positions on the second pictorial representation, means responsive to the first and second signals for mixing the first and second signals to produce output signals having particular characteristics upon the occurrence of positions of coincidence between the first and second pictorial representation, means responsive to the output signals having the particular characteristics from the output signal means for providing a visual indication of the positions of coincidence between the two pictorial representations, means responsive to the operation of the last mentioned means for providing a displacement in the presentation of at least one of the pictorial representations relative to the presentation of the other pictorial representation to obtain a new indication of the positions of coincidence between the representations, and means coupled to the last mentioned means for inhibiting the production of any visual indications during the period of obtaining a displacement between the pictorial representations.

5. In combination for comparing first and second pictorial representations taken of a particular area from a pair of spaced positions to obtain contour indications of the particular area, first means operative upon the first pictorial representation for sequentially sweeping different positions in the first pictorial representation in a particular spatial pattern to produce at each instant in the sweep first signals having amplitudes corresponding to the characteristics of the position being viewed on the visual image at that instant, second means operative upon the second pictorial representation for sequentially sweeping different positions in the second pictorial representation in the particular spatial pattern to produce at each instant in the sweep second signals having amplitudes corresponding to the characteristics of the position being viewed on the second pictorial representation at that instant, means including amplifier means coupled to the first and second sweep means for combining the first and second signals at each instant to obtain the production of output signals only upon the occurrence of a particular combined amplitude in the signals to represent positions of coincidence between the first and second pictorial representations, means responsive to the output signals to produce contour indications, and means responsive to the operation of the last mentioned means for producing a displacement of at least one of the pictorial representations relative to the sweep means in a particular direction upon the completion of each sweeping operation.

6. In combination for comparing first and second pictorial representations taken of a particular area from a pair of spaced positions to obtain contour indications of the particular area, first camera means operative upon the first pictorial representation for sweeping different positions in the first pictorial representation in a particular spatial pattern to produce at each instant first signals having amplitudes corresponding to the position being viewed on the pictorial representation at that instant, second camera means operative upon the second pictorial representation for sweeping different positions in the second pictorial representation in particular spatial pattern to produce at each instant second signals having amplitudes corresponding to the position being viewed on the pictorial representation at that instant, means including an amplifier responsive to the first and second signals to produce output signals representing positions of coincidence between the pictorial representations, means including a master monitor responsive to the output signals from the amplifier for displaying the positions of coincidence in accordance with the signals produced by the amplifier means, means responsive to the operation of the master monitor means for producing an incremental displacement of at least a particular one of the first and second pictorial representations in a particular direction relative to the camera means upon the occurrence of each display, and means coupled to the last mentioned means for inhibiting any display during the periods of relative displacement between the particular one of the first and second pictorial representations and the camera means.

7. In combination for comparing first and second pictorial representations taken of a particular area from a pair of spaced positions to obtain contour indications of the particular area, means including first optical means disposed to pass light from the first pictorial representation, means including second optical means disposed to pass light from the second pictorial representation, means including first scanning means disposed relative to the first optical means to scan the light passed at successive positions by the first optical means and constructed to produce signals in accordance with the intensity of such light, means including second scanning means disposed relative to the second optical means to scan the light passed at successive positions by the second optical means and constructed to produce signals in accordance with the intensity of such light, means including mixing means responsive to the signals produced by the first and second scanning means for mixing such signal indications at successive instants of time to obtain resultant signals having characteristics dependent upon the combined characteristics of the signals from the first and second scanning means at such instants of time, means responsive to the signals having particular characteristics from the mixing means to obtain a presentation for view of the positions at which such signals are produced, and means responsive to the signals from the scanning means and operative upon the completion of each scan for producing a displacement in a particular pattern between the position scanned at each instant by the scanning means on one of the pictorial representations relative to the position scanned at the same instant by the scanning means on the other pictorial representation.

8. The combination set forth in claim 7 in which the last mentioned means produces a displacement by varying the position of at least one of the pictorial representations relative to its associated optical means.

9. In combination for comparing first and second pictorial representations taken of a particular area from a pair of spaced positions to obtain contour indications of the particular area, means including first optical means responsive to the first pictorial representation for producing first signals in accordance with the characteristics of the first pictorial representation at the different positions on the first pictorial representation, means including second optical means responsive to the second pictorial representation for producing second signals in accordance with the characteristics of the second pictorial representation at the different positions on the second pictorial representation, means responsive to the first and second signals from the last two mentioned means for mixing the signals representing the different positions on the first and second pictorial representations to produce output signals having particular characteristics at the positions of coincidence on the first and second pictorial representations, means responsive to the signals from the mixing means for presenting for view indications upon the occurrence of the output signals having the particular characteristics, means responsive to the signals having the particular characteristics from the mixing means and operative upon the presentation for view of the indications upon the occurrence of the output signals having the particular characteristics for providing an adjustment in the positions simultaneously mixed at each instant in the mixing means from the first and second pictorial representations where the characteristics of such positions are respectively represented at each instant by the first and second signals, and means responsive to the adjustments provided by the last mentioned means for preventing any presentation of indications for view during such adjustments.

10. In combination for comparing first and second pictorial representations taken of a particular area from a pair of spaced positions to obtain contour indications of the particular area, means coupled to the first and second pictorial representations for providing a comparison between the pictorial representations to obtain output indications representing only a first individual elevation in the particular area, means coupled to the comparison means for presenting for view the output indications representing the first individual elevation, and means responsive to the operation of the last mentioned means for providing an adjustment in the comparison between the pictorial representations to obtain output indications representing only a second individual elevation in the particular area upon such adjustment and in accordance with the amount of such adjustment.

11. In combination for comparing first and second pictorial representations taken of a particular area from a pair of spaced positions to obtain contour indications of the particular area, means coupled to the first and second pictorial representations for providing a comparison between first and second pictorial representations to determine the positions of coincidence between the pictorial representations and to obtain output indications at such positions of coincidence in representation of only an individual elevation in the particular area and in representation of the complete contour of the individual elevation, means responsive to the output indications from the comparison means for presenting for view the output indications produced by the comparision means in representation of the individual elevation, and means responsive to the operation of the last mentioned means for providing incremental adjustments in the comparison between the pictorial representations to obtain a determination of the positions of coincidence between the pictorial representations upon each adjustment and to obtain output indications at such positions in representation of elevations having incremental relationships to the individual elevation previously recorded in accordance with the incremental adjustments in the comparison.

12. In combination for comparing first and second pictorial representations taken of a particular area from a pair of spaced positions to obtain contour indications of the particular area, means including first optical means operative upon the first pictorial representation for producing first signals having at successive instants of time characteristics corresponding to the visual characteristics at successive positions on the first pictorial representation, means including second optical means operative upon the second pictorial representation for producing second signals having at the successive instants of time characteristics corresponding to the visual characteristics at successive positions on the second pictorial representation, means responsive to the first and second signals for mixing the first and second signals at successive instants of time to produce output signals having particular characteristics representing positions of coincidence between the first and second pictorial representations, means responsive to the output signals from the output signal means for providing a visual indication of the positions of coincidence between the two pictorial representations, and means responsive to the operation of the last mentioned means for providing a displacement of at least one of the pictorial representations relative to the optical means to obtain a new comparison between the pictorial representations.

13. In combination for comparing first and second pictorial representations taken of a particular area from a pair of spaced positions to obtain contour indications of the particular area, a first camera operative upon the first pictorial representation for sequentially scanning different positions on the first pictorial representation in a particular pattern to produce at each instant first signals having amplitudes dependent upon the light intensity of the position being scanned on the first pictorial representation at that instant, a second camera operative upon the second pictorial representation for sequentially scanning different positions on the second pictorial representation in the particular pattern to produce at each instant second signals having amplitudes dependent upon the light intensity of the position being scanned on the second pictorial representation at that instant, mixing circuitry responsive to the first and second signals from the first and second cameras for combining these signals at each instant to produce an output signal having particular characteristics only for the positions of corresponding light intensity simultaneously scanned on the first and second pictorial representations, means including a master monitor responsive to the signals from the mixing circuitry for producing a visual image representing the positions of corresponding light intensity simultaneously scanned on the first and second pictorial representations, and means responsive to the operation of the master monitor means for providing a displacement in the first pictorial representation relative to the first camera upon the production of the visual image by the master monitor.

14. In combination for comparing first and second pictorial representation of a first particular area taken from a pair of spaced positions to obtain a contour representation of the first particular area in a second particular area, wherein the pictorial representations are stationary during the production of each contour representation, first electical means operative upon the first pictorial representation for sequentially scanning the first pictorial representation at different positions in the first pictorial representation to produce signals in accordance with the light intensity of the position on the first pictorial representation being scanned at each instant, second electrical means operative upon the second pictorial reprsentation for sequentially scanning the second pictorial representation at different positions in the second pictorial representation to produce signals in accordance with the light intensity of the position on the second pictorial representation being scanned at each instant, means responsive to the singals from the first and second scanning means for mixing such signals to produce resultant signals having at each instant characteristics dependent upon the characteristics of the signals from the first and second scanning means, third electrical means for sweeping all of the different positions in the second particular area and responsive to the signals from the mixing means for producing a visual contour in the second particular area in accordance with the characteristics of the signals from the mixing means, and means responsive to the operation of the third electrical means for producing adjustments in the sequential scanning of the first pictorial representation by the first scanning means relative to the sequential scanning of the second pictorial representation by the second scanning means to obtain corresponding adjustments in the contour being viewed by the third electrical means in the second particular area.

15. The combination set forth in claim 14 including, means responsive to the adjusting means for preventing any production of the visual contour in the second particular area during the production of adjustments by the adjusting means in the sequential scanning of the first pictorial representation by the first scanning means relative to the sequential scanning of the second pictorial representation by the second scanning means.

References Cited in the file of this patent

UNITED STATES PATENTS

| | | |
|---|---|---|
| 1,396,047 | Nistri | Nov. 8, 1921 |
| 1,699,136 | Eliel | Jan. 15, 1929 |
| 2,283,226 | Porter | May 19, 1942 |
| 2,626,989 | Brown | Jan. 27, 1953 |
| 2,679,636 | Hillyer | May 25, 1954 |
| 2,896,501 | Stamps | July 28, 1959 |

FOREIGN PATENTS

| | | |
|---|---|---|
| 266,044 | Great Britain | Feb. 16, 1927 |
| 537,740 | France | Mar. 8, 1922 |